UNITED STATES PATENT OFFICE.

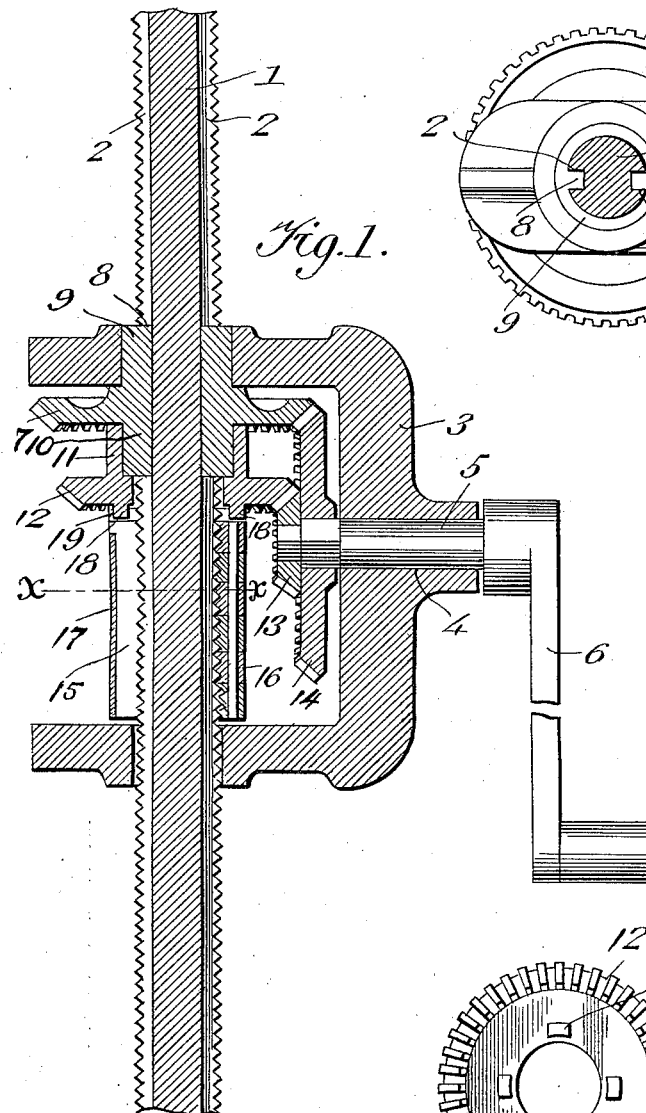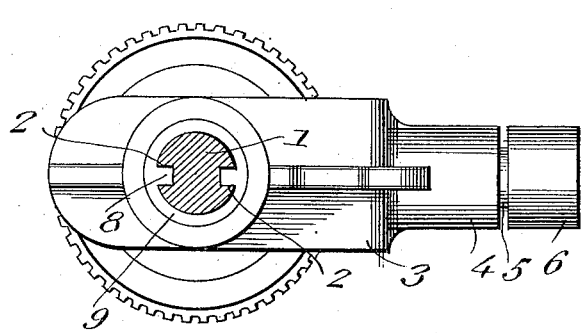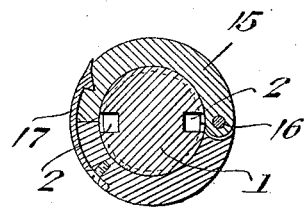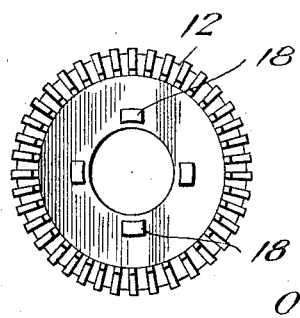

OLIVER CLUTS, WALTER SALISBURY, AND JESSE W. TURALL, OF CUBA, ILLINOIS.

DRILLING-MACHINE.

1,023,722.     Specification of Letters Patent.    Patented Apr. 16, 1912.

Application filed July 1, 1911. Serial No. 636,391.

*To all whom it may concern:*

Be it known that we, OLIVER CLUTS, WALTER SALISBURY, and JESSE W. TURALL, citizens of the United States, residing at Cuba, in the county of Fulton and State of Illinois, have invented new and useful Improvements in Drilling-Machines, of which the following is a specification.

This invention provides a drilling machine which will admit of varying the feed of the tool and at the same time admit of the tool being quickly withdrawn from the bore when required.

The invention contemplates a machine embodying a drill shaft, a separable nut mounted upon the drill shaft, means for rotating the nut to advance the drill shaft to feed the tool to the work, and means for imparting rotary movement to the drill shaft, both mechanisms being operated from the same shaft.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a sectional view of part of a drilling machine embodying the invention. Fig. 2 is an end view thereof. Fig. 3 is a section of the drill shaft and feed nut on the line $x$—$x$ of Fig. 1. Fig. 4 is a detail view of the gear for rotating the feed nut.

Corresponding and like parts are referred to in the following description, and indicated in all the views of the drawing, by the same reference characters.

The drill shaft is indicated at 1 and has longitudinal grooves 2 in opposite sides. The drill shaft is threaded throughout its length and is adapted to receive a drill or like tool which is fitted thereto in any manner. A frame 3 of substantially U form has openings in its opposite members through which the drill shaft passes and is provided at its closed side with a bearing 4 in which is mounted a shaft 5, the latter adapted to have a crank 6 fitted to its outer end. A bevel gear 7 is mounted upon the drill shaft and has inner ribs 8 which enter the grooves 2 of the drill shaft to cause both to rotate together. The drill shaft is mounted to move freely through the gear wheel 7. A hub 9 is located upon one side of the gear wheel 7 and is mounted in one member of the frame 3 and a hub 10 projecting from the opposite side of the gear wheel receives the hub 11 of a bevel gear 12. Two bevel gears 13 and 14 are secured to the inner end of the shaft 5 and mesh respectively with the gear wheels 12 and 7. The gear wheels are of different diameters, thereby resulting in rotating the gears 7 and 12 at different speeds. By having the bevel gears 12 and 13 detachably mounted upon the parts 10 and 5 they may be replaced by other gears of different diameters so that the gear wheels 7 and 12 may be relatively rotated at any required speed. The gear wheels 7 and 14 constitute drivers for rotating the drill shaft. The gear wheels 12 and 13 serve to operate the feed mechanism whereby the drill shaft is advanced to move the drill or cutting tool forward.

A feed nut 15 is mounted upon the drill shaft and has screwthread connection therewith, said feed nut being located between the gear wheel 12 and the member of the frame 3 in which the drill shaft is directly mounted. The feed nut is formed of similar halves or sections which have mating knuckles along corresponding edges to receive a pintle 16 by means of which said sections or halves are pivotally or hingedly connected. A catch 17 is secured to one of the sections of the feed nut and is adapted to engage with the other section so as to hold both sections closed when brought together about the drill shaft. The catch 17 preferably consists of a spring plate which is fitted into a recess formed in the outer side of the sections, said spring plate being attached along one edge to one of the sections and having a beveled stop at its opposite edge to engage with a corresponding shouldered portion of the recess. The feed nut may be quickly placed in position or instantly removed from the drill shaft by opening the sections thereof. When the feed nut is in position it interlocks with the gear wheel 12 and is rotatable therewith. For this purpose the gear wheel 12 has lugs 18, which enter depressions 19 formed in the adjacent end of the feed nut. The depressions 19 are located in line with the meeting edges of the sections or halves so that upon opening the sections the feed nut is at the same time cleared from the projections 18, thereby enabling the feed nut to be easily and conveniently removed.

In the operation of the machine the drill or other cutting tool is fitted to the drill shaft 1, and upon rotating the shaft 5 the drill shaft is rotated through the instrumentality of the gear wheels 7 and 14 and at the same time the feed nut 15 is rotated to advance the drill shaft to feed the cutting tool as the work progresses. When it is required to back the drill shaft the feed nut is opened, thereby enabling the drill shaft to be moved quickly to withdraw the cutting tool from the opening. By substituting gear wheels 12 and 13 of different diameters the feed of the cutting tool may be regulated.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a drilling machine, the combination of a frame, a drill shaft mounted in the frame, means for imparting rotary movement to the drill shaft, a feed nut mounted upon the drill shaft and comprising similar sections hingedly connected at one edge, a spring plate secured along one edge to one of the sections and having an engaging portion at its opposite edge to interlock with the other section of the feed nut, and means for imparting rotary movement to the feed nut.

2. In a drilling machine, the combination of a frame, a drill shaft mounted in the frame and adapted to have a rotary and a longitudinal movement imparted thereto, a gear wheel mounted upon the drill shaft and rotatable therewith and having the drill shaft freely movable therethrough, said gear wheel having hub portions upon opposite sides, one of said hubs being mounted in the frame, a second gear wheel mounted upon the opposite hub portion of the gear wheel and having projecting portions, a sectional feed nut mounted upon the drill shaft and having depressions receiving the projecting portions of said second gear wheel, an operating shaft mounted in the frame, and gear wheels secured to the operating shaft and in mesh with the first and second mentioned gear wheels.

In testimony whereof we affix our signatures in presence of two witnesses.

OLIVER CLUTS.
WALTER SALISBURY.
JESSE W. TURALL.

Witnesses:
N. M. WILLIAMSON,
FLOYD SHUYOCK.

Copies of this patent may be obtained for five cents each, by addressing the "Commissioner of Patents, Washington, D. C."